United States Patent
Scully et al.

(10) Patent No.: US 6,830,146 B1
(45) Date of Patent: Dec. 14, 2004

(54) GUIDE RAIL SYSTEM FOR ROLLER-TYPE CONVEYORS

(75) Inventors: Geoffrey B. Scully, Adrian, MI (US); Kevin Morse, Clayton, MI (US); Richard Morse, Manitou Beach, MI (US)

(73) Assignee: Cargotainer Adrian Fabricators, Inc., Adrian, MI (US)

( * ) Notice: Subject to any disclaimer, the term of this patent is extended or adjusted under 35 U.S.C. 154(b) by 0 days.

(21) Appl. No.: 10/621,124

(22) Filed: Jul. 16, 2003

Related U.S. Application Data

(60) Provisional application No. 60/400,263, filed on Aug. 1, 2002.

(51) Int. Cl.$^7$ .............................................. B65G 15/60
(52) U.S. Cl. ............................... 198/836.1; 198/860.1; 198/860.2
(58) Field of Search ........................ 198/836.1, 836.2, 198/836.3, 836.4, 860.1, 860.2, 780

(56) References Cited

U.S. PATENT DOCUMENTS

| | | | |
|---|---|---|---|
| 2,801,730 A | | 8/1957 | Strickler ...................... 198/204 |
| 3,193,077 A | | 7/1965 | Goldberg ...................... 198/28 |
| 3,744,610 A | * | 7/1973 | Tabler ...................... 193/35 R |
| 3,934,706 A | | 1/1976 | Tice ............................ 198/32 |
| 3,989,137 A | * | 11/1976 | Ward ....................... 198/836.1 |
| 4,172,677 A | * | 10/1979 | Gunti .......................... 403/189 |
| 4,232,774 A | * | 11/1980 | Gunti ......................... 193/35 J |
| 4,308,946 A | | 1/1982 | Ouellette .................... 198/790 |
| 4,823,927 A | * | 4/1989 | Jensen .................... 193/35 SS |
| 4,932,517 A | * | 6/1990 | Johnson ..................... 198/836.1 |
| 4,958,725 A | * | 9/1990 | Meade et al. ............. 198/836.1 |
| 5,031,757 A | * | 7/1991 | Draebel et al. .............. 198/852 |
| 5,082,108 A | * | 1/1992 | Douglas ................... 198/836.4 |
| 5,090,547 A | * | 2/1992 | Schafer ..................... 193/35 R |
| 5,178,263 A | | 1/1993 | Kempen ................... 198/836.1 |
| 5,372,247 A | * | 12/1994 | Nishikawa .................. 198/780 |
| 5,460,257 A | * | 10/1995 | Yoshida ....................... 198/358 |
| 5,505,138 A | * | 4/1996 | Newcomb et al. .......... 104/111 |
| 5,522,206 A | * | 6/1996 | Moncrief et al. ............. 53/543 |
| 5,542,522 A | * | 8/1996 | Adrian et al. ............... 198/337 |
| 5,657,854 A | * | 8/1997 | Chen et al. ................. 198/787 |
| 5,857,554 A | * | 1/1999 | Toye ........................ 193/35 R |
| 6,003,662 A | | 12/1999 | McCaffrey et al. ....... 198/836.3 |
| 6,089,385 A | * | 7/2000 | Nozawa ...................... 211/59.2 |
| 6,189,685 B1 | | 2/2001 | Ledingham et al. ...... 198/836.3 |
| 6,286,660 B1 | * | 9/2001 | Kalm .......................... 198/782 |
| 6,427,831 B1 | * | 8/2002 | Norton ....................... 198/841 |
| 6,523,679 B1 | * | 2/2003 | Manchester ................ 198/841 |
| 6,533,108 B1 | * | 3/2003 | Ledingham ................ 198/841 |
| 6,533,110 B1 | | 3/2003 | Ledingham .............. 198/861.1 |
| 6,666,325 B1 | * | 12/2003 | Buenning et al. ........... 198/782 |

\* cited by examiner

*Primary Examiner*—Douglas Hess
(74) *Attorney, Agent, or Firm*—Young & Basile, P.C.

(57) ABSTRACT

A guide rail for a roller system having a conveyor frame formed by parallel sidebars, the guide rail includes an elongate member and a plurality of clips welded to a lower edge of the elongate member. Each clip has a U-shaped configuration which is sized for snapping over an upper horizontal edge of the sidebar. The U-shaped clip has an inner flange for positioning adjacent the rollers and an outer flange for positioning along the exterior of the conveyor frame. The outer flange has an angled end directed toward the inner flange to provide stability to the guide rail.

14 Claims, 3 Drawing Sheets

US 6,830,146 B1

GUIDE RAIL SYSTEM FOR ROLLER-TYPE CONVEYORS

This patent application claims priority of provisional patent application Ser. No. 60/400,263 filed on Aug. 1, 2002.

BACKGROUND OF THE INVENTION

Roller-type conveyors are well known and widely used in manufacturing and retailing facilities. Typical roller-type conveyors include gravity conveyors in which freely rotatable rollers support articles as they are transported from one location on the conveyor to another location. The roller-type conveyor has framed sidebars defining the lateral edges of the conveyor. The rollers generally extend above the upper flanges of the framed sidebars. Since during the movement of the articles along the path of the conveyor there is no obstruction along the frame bars, the articles can drop to the floor with liability of damage and waste of manpower during the retrieval of the articles. Guide rail systems have been provided in the prior art to prevent the articles traveling along the path of the conveyor from dropping off of the rollers. However, the existing guide rails system require numerous components such as brackets and rail strips that must be assembled together as the guide rail system is being installed along the length of the conveyor.

SUMMARY OF THE INVENTION

It is the intent of the invention to address the aforementioned concerns. The invention provides a quick, easy, and labor saving guide rail installation that can also be removed and reconfigured along the roller-type conveyor within minutes. The invention is a guide rail system that requires no tools or separate screws, bolts, or clamps for installation on the roller type-conveyor.

The invention provides a guide rail for a conveyor system having a conveyor frame formed by parallel sidebars and conveying elements therebetween. The parallel sidebars are formed by upper and lower outwardly extending horizontal flanges and a vertical web therebetween. The guide rail includes an elongate member having a length for placement adjacent one of the parallel sidebars and a plurality of brackets fixedly secured to an edge of the elongate member, wherein the bracket has a configuration for selectively clipping the brackets around at least a portion of the vertical web and outwardly extending horizontal flange of the sidebar.

In another aspect of the invention, the elongate member is orientated and secured to the plurality of brackets so that the elongate member is positioned above the parallel sidebar when the brackets are selectively clipped onto at least a portion of the vertical web and upper outwardly extending horizontal flange.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2a is a perspective view of a guide rail on a roller-type conveyor according to the present invention;

FIG. 2b is an enlarged view of the circled portion in FIG. 2a.

FIG. 3 is an end view of the guide-rail and conveyor shown in FIG. 2a;

DESCRIPTION OF THE PREFERRED EMBODIMENT

Figure 1:
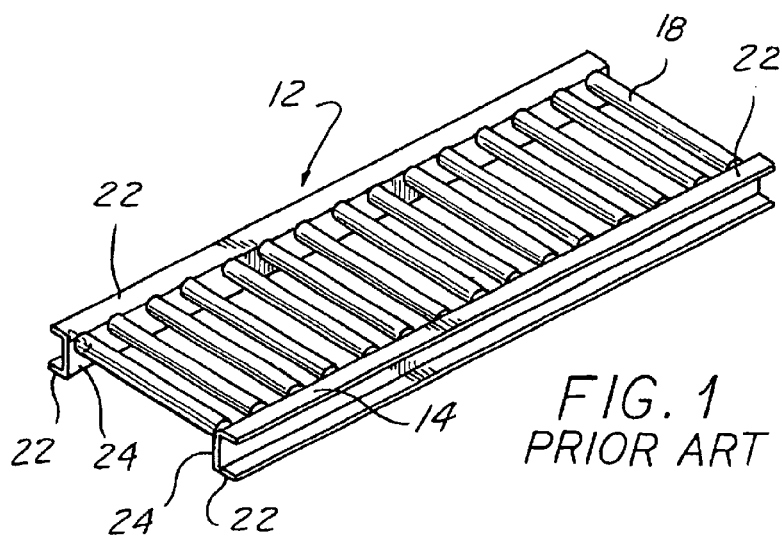
FIG. 1 is a perspective view of a conventional roller-type conveyor.

With reference to the FIGS. 1–7, the invention is a guide rail system designed to provide a device 10 that clips onto the lateral framed sidebars 14 of a carton flow roller-type conveyor 12. These carton flow roller-type conveyors 12 are installed in rack systems to provide gravity flow of cartons or other articles (first-in, first-out). The guide rail system 10 of the present invention includes a guide rail 16 for keeping merchandise cartons from failing off the roller flow tracks 18 and offers ultimate ease in attaching and reconfiguring for accommodations of various size cartons.

Figure 3:
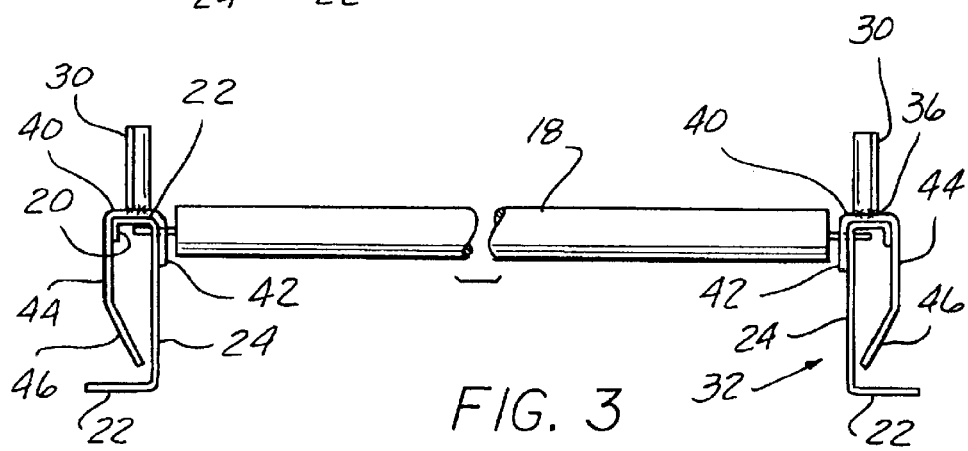

The roller-type conveyor 12 includes lateral sidebars 14 wherein the roller tracks 18 are disposed therebetween. The sidebars 14 are essentially U-shaped as shown in FIG. 1. The U-shaped sidebars have a center web 24 integrally connected to and disposed between two outer flanges 26. The sidebars 14 may also include slight variations such as having a vertical lip 20 extending from one of the outer flanges 22 of the U-shaped sidebar 14, as shown in FIG. 3. The individual roller tracks 18 are connected at their ends to the center portion of the U-shaped sidebars 14.

Figure 4:
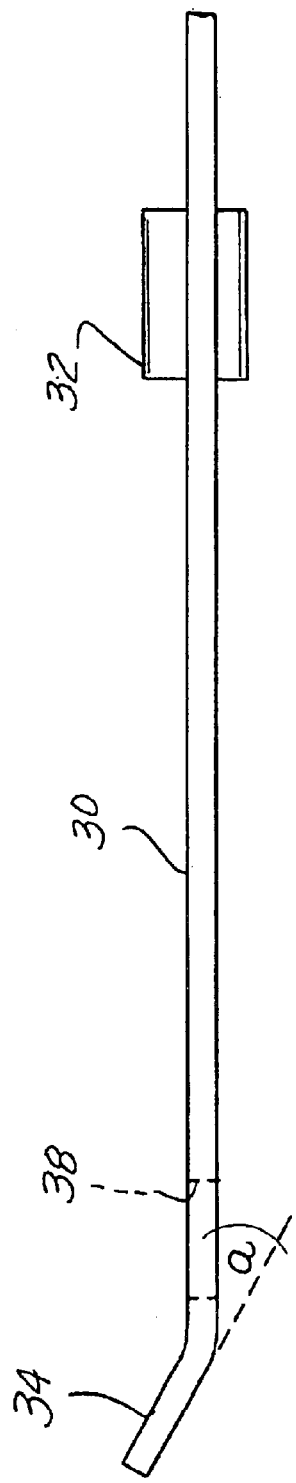
FIG. 4 is a top view of the guide rail.
Figure 5:
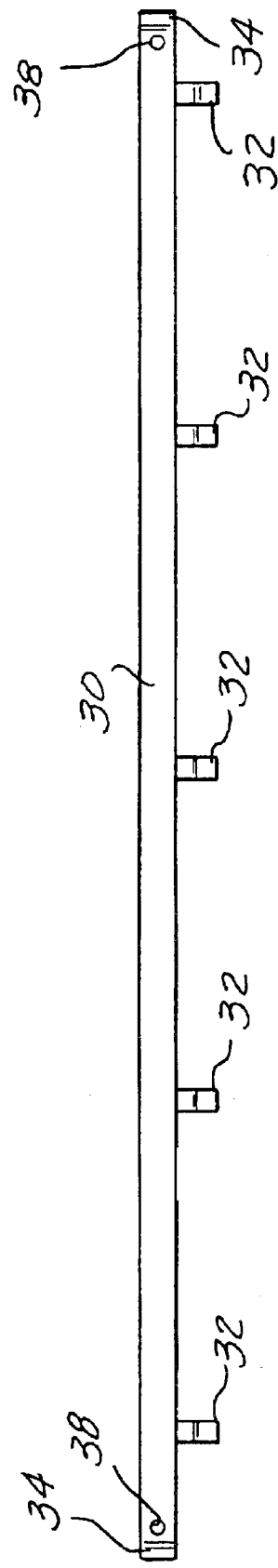
FIG. 5 is a side view of the guide rail.

The guide rail 10 is made of a slide rail 30 and enough slide rail clips 32 to accommodate the length of the roller-type conveyor 12. The slide rail 30 has formed angled (a) bend portions 34 at both ends, as best shown in FIG. 4. Preferably the bend portions 34 are angled 28 degrees from the center portion of the rail 30. The bend portions 34 help to guide and funnel the cartons and other articles (not shown) into proper location when being loaded. As seen in FIG. 5., the slide rail 30 also has ⅝" holes 38 punched at each end adjacent the 28 degree bends portions 34. The holes 38 are formed to allow the rail 30 to be held by hooks during the manufacturing process thereof, in order for the rail to be sent through the paint line.

The slide rail 30 is preferably made of ⅛" thick steel and produced at a length and height that will accommodate the length of the roller-type conveyor 12 on which the guide rail system 10 is attached to in its environment. The typical length of a slide rail would be 6–8 feet long. For conveyor systems having a length longer than 6–8 feet, multiple guide rail systems 10 can be butted adjacent to each other to extend over the entire length of the conveyor 12. The height of the rail 30 is dictated by customer specification and preference, but a typical height would be 1.25–2.0 inches.

Figure 6:
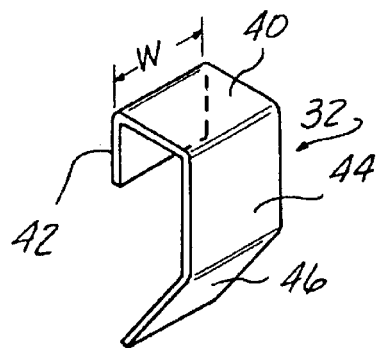
FIG. 6 is a perspective view of a clip on the guide rail.
Figure 7:
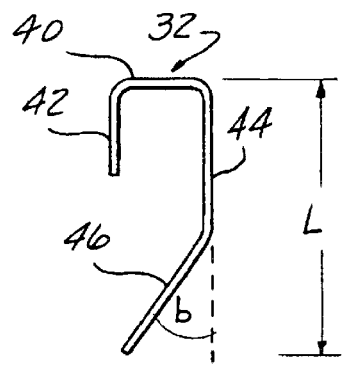
FIG. 7 is an end view of the clip in FIG. 6.
Figures 2A, 2B:
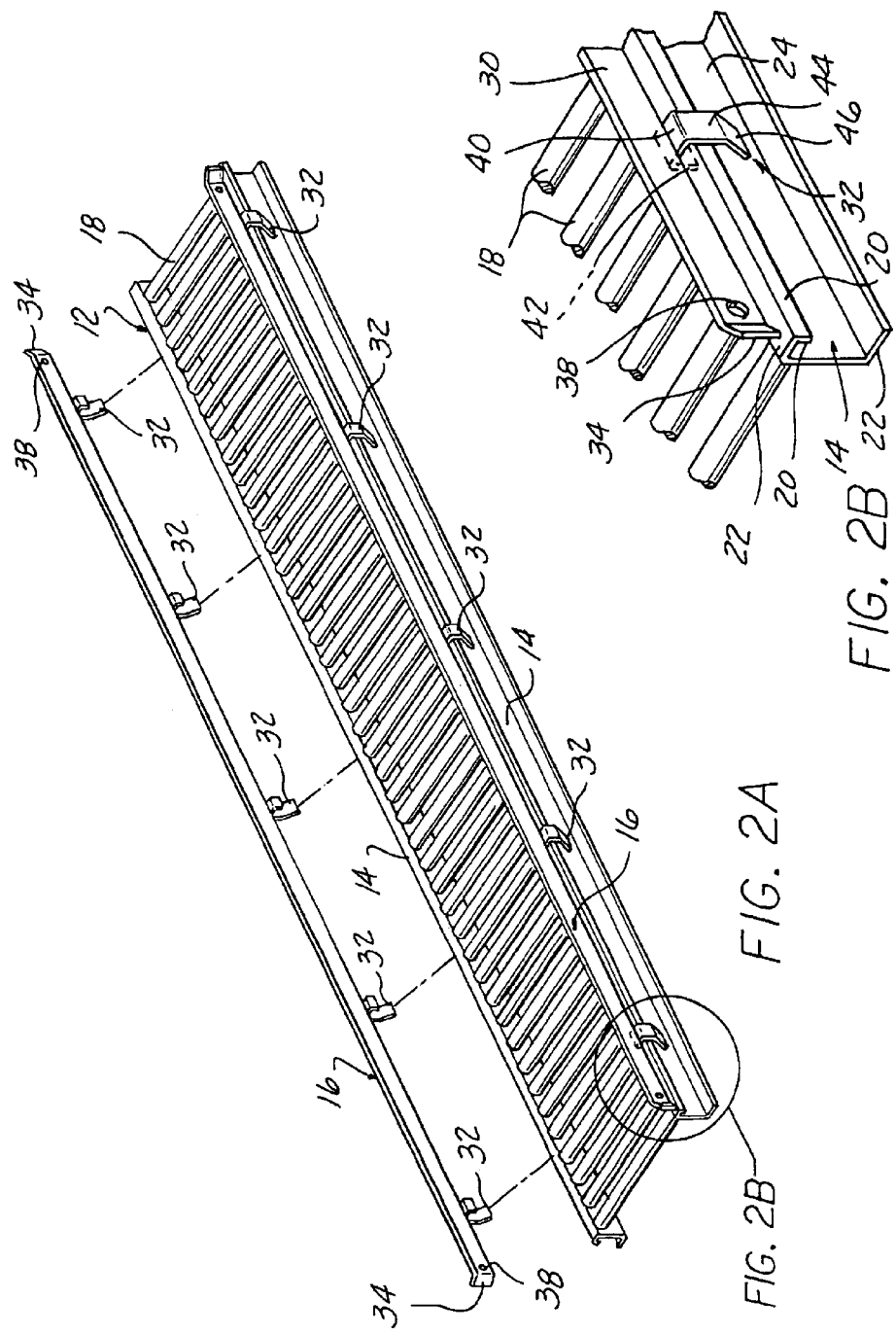

The clips 32 are shown in FIGS. 6 and 7 and are welded to the bottom surface 36 of the rail 30 as shown in FIG. 3. The clips 32 have a generally U-shaped configuration. The bottom surface 36 of the slide rail 30 is welded to the middle section 40 of the U-shaped portion of the clip 32. The U-shaped configuration of the clip 32 has a first or inner flange 42 continuously and integrally connected and formed to the middle section of 40 of the U-shaped portion of the clip. The U-shaped clip 32 further includes a second or outer flange 44. The outer flange 44 has a longer vertical length than the inner flange 42. The outer flange 44 has a bent or angled portion 46 of approximately 36° angle (b). The bent portion 46 angles toward the inner flange 42. The clips 32 are typically 1.0 inch wide (W) and having a length (L) of 2.25 inches. The sizes of the clips 32 can vary to accommodate various sizes of the lateral sidebars 14. The clips 32 are welded to the edge 36 of the slide rail 30 so that the inner and outer flanges 42, 43, respectively, are all orientated in the same direction. The clips 32 start at approximately 3.0–4.0 inches from the ends of the slide rail and are spaced approximately 15.0–18.0 inches apart from an adjacent clip 32.

The installation of the guide rail system of the present invention is quick and easy. The guide rail system 10 is placed on the framed sidebar 14 so that the longer outer flange 44 is located on the exterior of the conveyor 12. The individual clips 32 are then snapped onto the sidebar 14. The middle section 40 of the clip 32 rests on the upper outer flange 26 of the sidebar 14. The inner flange 42 of the clip 32 rests against a portion of the center web 24 of the sidebar 14. The size of U-shaped configuration of the clip 32 is predetermined to snap over the upper flange 22 of the sidebar 14 so that the clips 32 fit snugly on the sidebar 14. The location of the clips 32 on the rail 30 are provided so that the inner flange 42 of each clip 32 is positioned between a pair of rollers 18 when installed on the conveyor 12. When the clip 32 is installed on the sidebar 14, the angled portion 46 of the clip 32 is directed toward the center web 24 of the sidebar. The angled portion 46 provides stability to the rail 30, especially if the rail 30 is bumped by an article on the conveyor 12. The clips 32 also have an elasticity in its formation that allows the clip 32 to snap on and off of the sidebar 14 for easy installation and removal of the guide rail system without the use of separate screws, bolts or clamps.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scopes is to be accorded the broadest interpretation so as to encompass all such modifications and equivalent structures as is permitted under the law.

What is claimed is:

1. An improved guide rail for use on a conveyor system having a conveyor frame formed by parallel sidebars and a conveying element therebetween, each parallel side bar is U-shaped and formed by upper and lower outwardly extending horizontal flanges and a vertical web therebetween, the improvement comprising:

an elongate member having a length for placement adjacent one of the parallel side bars; and a plurality of clips secured to a bottom edge of the elongate member, said clips having a configuration for securing the elongate member to the one of the U-shaped sidebars by selectively clipping said clips around at least a portion of the vertical web and upper outwardly extending horizontal flange.

2. The improvement of claim 1, wherein said elongate member is orientated and secured to the plurality of clips so that the elongate member is positioned above the one of the parallel side bars when the clips are selectively clipped onto at least a portion of the vertical web and upper outwardly extending horizontal flange.

3. The improvement of claim 1, wherein each clip is welded to a lower edge of the elongate member for positioning the elongate member directly above each clip.

4. The improvement of claim 3, wherein the clip is U-shaped and configured to snap over the upper horizontal flange of the sidebar.

5. The improvement of claim 1, wherein each clip has a U-shaped configuration corresponding to a portion of the U-shaped sidebar and with a middle section welded to the elongate member.

6. The improvement of claim 5, wherein the U-shaped configuration of each clip has an inner flange and an outer flange extending from the middle section, wherein the outer flange is longer than the inner flange and has a bent end portion for directing between the upper and lower outwardly extending horizontal flanges to provide balance when the clips are secured to the sidebar.

7. The improvement of claim 6, wherein the clips are all welded to the elongate member in the same orientation.

8. The improvement of claim 1, wherein the elongate member has angled ends for guiding articles on the conveying elements.

9. The improvement of claim 1, wherein the plurality of clips are evenly spaced along the length of the elongate member.

10. An improved guide rail for use on a conveyor system having a conveyor frame formed by parallel sidebars and a conveying element therebetween, each parallel sidebar having a U-shaped configuration formed by upper and lower outwardly extending horizontal flanges and a vertical web therebetween, the improvement comprising:

an elongate member having a length for placement adjacent one of the parallel sidebars; and a plurality of clips secured to a bottom edge of the elongate member, wherein each clip has a U-shaped upper portion for corresponding to a portion of the U-shaped sidebar hooking over the upper outwardly extending horizontal flange of the sidebar.

11. The improvement of claim 10, wherein the plurality of clips have an elasticity for allowing the clip to selectively snap on and off the sidebar.

12. The improvement of claim 10, wherein at least a portion of the U-shaped upper portion extends over and grips a portion of the vertical web of the sidebar.

13. The improvement of claim 10, wherein the upper U-shaped portion of the clip has a first flange longer than the opposing second leg, said second opposing flange extending over a portion of the vertical web of the sidebar and the first flange having an angled portion for providing stability.

14. The improvement of claim 13, wherein the angled portion of the first flange is overstated to be directed toward the vertical web of the sidebar when the guide rail is attached to the conveyor frame.

* * * * *